June 29, 1937.　　　　L. G. HARRIS　　　　2,085,654
ARMPIT REST FISHING ROD HANDLE
Filed Nov. 27, 1935
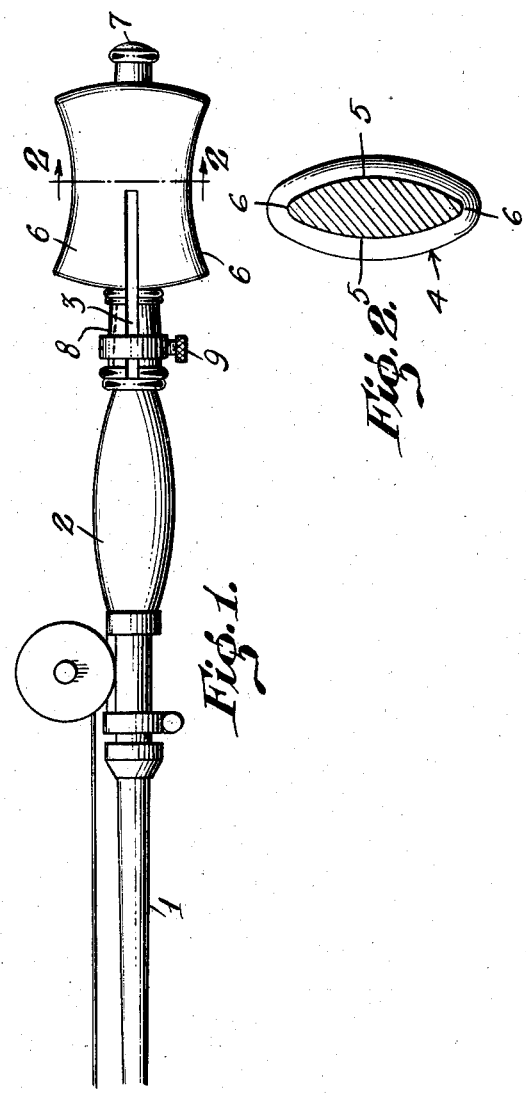
Lewis G. Harris,
INVENTOR Patented June 29, 1937

2,085,654

UNITED STATES PATENT OFFICE 2,085,654

ARMPIT REST FISHING ROD HANDLE

Lewis G. Harris, Baltimore, Md.

Application November 27, 1935, Serial No. 51,937

1 Claim. (Cl. 43—25)

This invention relates to fishing pole armpit rests and has for the primary object the provision of a device of this character which may form a part of a fishing pole or as an attachment thereto and which will permit a pole to be supported by placing the attachment in the armpit of the fisherman so that the pole may be held over long periods of time without fatiguing the fisherman and also the pole may be conveniently supported between the knees while adjusting, operating or assembling reel and tackle parts.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary side elevation showing a fishing pole equipped with a rest constructed in accordance with my invention.

Figure 2 is a transverse sectional view taken on the line 2—2 of Figure 1.

Referring in detail to the drawing, the numeral 1 indicates a conventional type of fishing pole including a handle 2 and suitably secured to the latter or may form an integral part thereof is a shank 3 on which is secured an elongated body 4 having opposed concaved side faces 5 and concaved side edges 6. One end of the body 4 has formed thereon a projection or button 7 so that the pole 1 may be rested against a person's body in the usual way or when desiring to support the pole over long periods of time the body 4 is placed within the armpit of the user and thereby gripped by the arm pressing the body 4 of the rest against the side of the body of the person, consequently permitting the pole 1 to be held with comparative ease and without fatigue to the person. The concaved faces 5 and 6 of the body 4 permit the latter to snugly fit within the armpit of the person or the body 4 may be placed between the knees of a person and thereby held so that the reel and fishing tackle may be conveniently adjusted, removed or applied to the pole.

The body 4 has formed thereon a split sleeve 8 which may be readily slipped over the shank 3 of the handle 2 and held thereon by a clamp 9 consequently permitting the attachment to be easily adapted to the pole.

Having described the invention, I claim:

An attachment for fishing poles comprising an elongated body having concaved oposite faces and side edges, a split sleeve formed on said body to detachably secure the latter to a handle of a fishing pole and located at one end of the body, and a projection formed on the other end of the body.

LEWIS G. HARRIS.